(No Model.)  2 Sheets—Sheet 1.
G. LITTLE.
Relay or Sounder Magnet.
No. 234,415.  Patented Nov. 16, 1880.
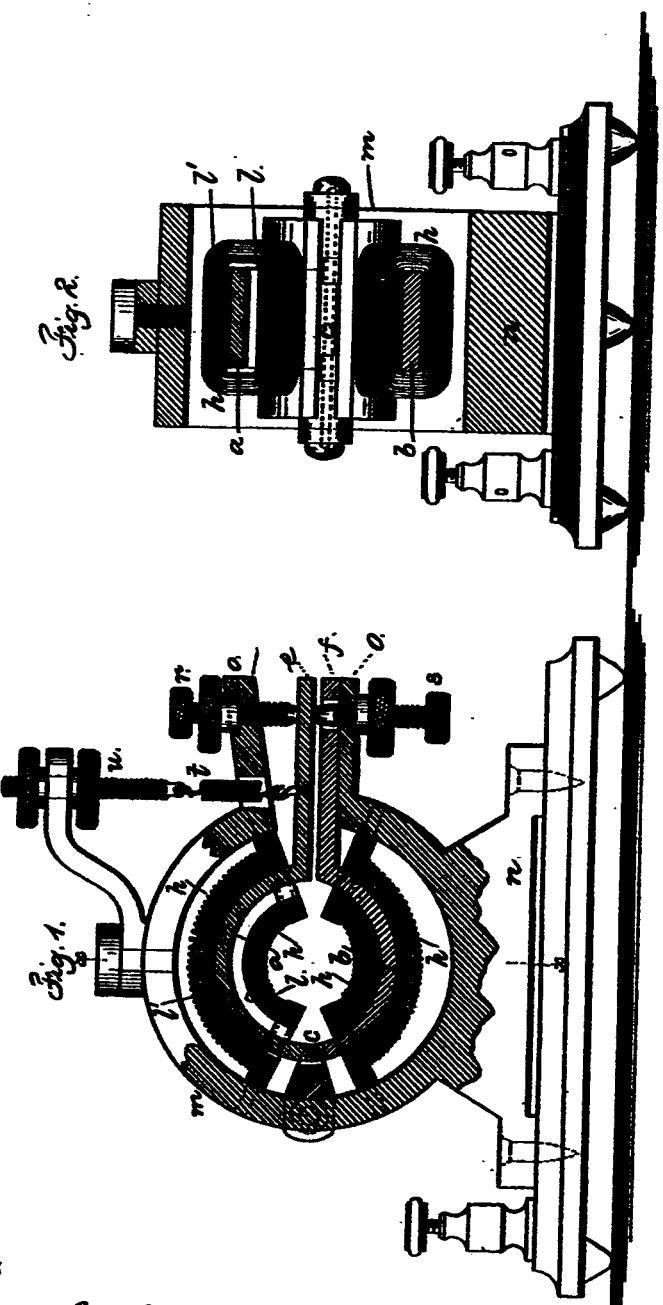
Witnesses
Chas. H. Smith
Harold Serrell
Inventor
George Little
for Lemuel W. Serrell
att'y (No Model.)   2 Sheets—Sheet 2.

G. LITTLE.
Relay or Sounder Magnet.

No. 234,415.    Patented Nov. 16, 1880.

Witnesses
Chas. H. Smith
Harold Serrell

Inventor
George Little.
L. W. Serrell
att'y

UNITED STATES PATENT OFFICE.

GEORGE LITTLE, OF WEST BERGEN, NEW JERSEY.

RELAY OR SOUNDER MAGNET.

SPECIFICATION forming part of Letters Patent No. 234,415, dated November 16, 1880.

Application filed August 12, 1880. (No model.)

*To all whom it may concern:*

Be it known that I, GEORGE LITTLE, of West Bergen, in the county of Hudson and State of New Jersey, have invented an Improvement in Relay or Sounder Magnets, of which the following is a specification.

In Letters Patent No. 125,583, granted to me April 9, 1872, a printing-telegraph instrument is shown in which the type-wheel and the device that moves the impression-pad become the poles of an electro-magnet, and the motion required results from the attraction between the poles.

My present invention relates to an electro-magnet arranged so as to act as a sounder or relay, or both, and in which there is not any armature, and the motion required is obtained by the attraction between the poles of the magnet, one or both poles being movable. By this means the required motion is obtained from a very weak current, and the magnet is very cheap, durable, and compact.

Figure 4:
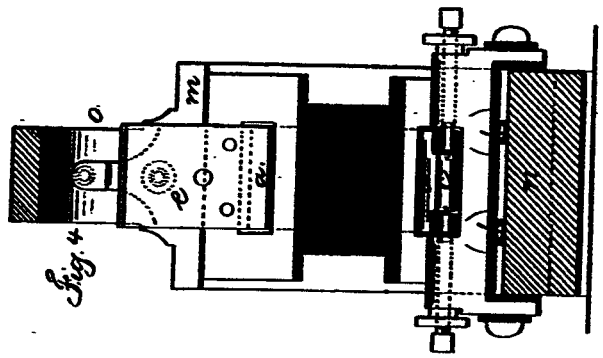
Figure 6:
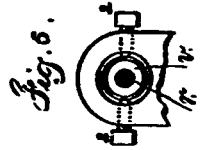
Figure 8:
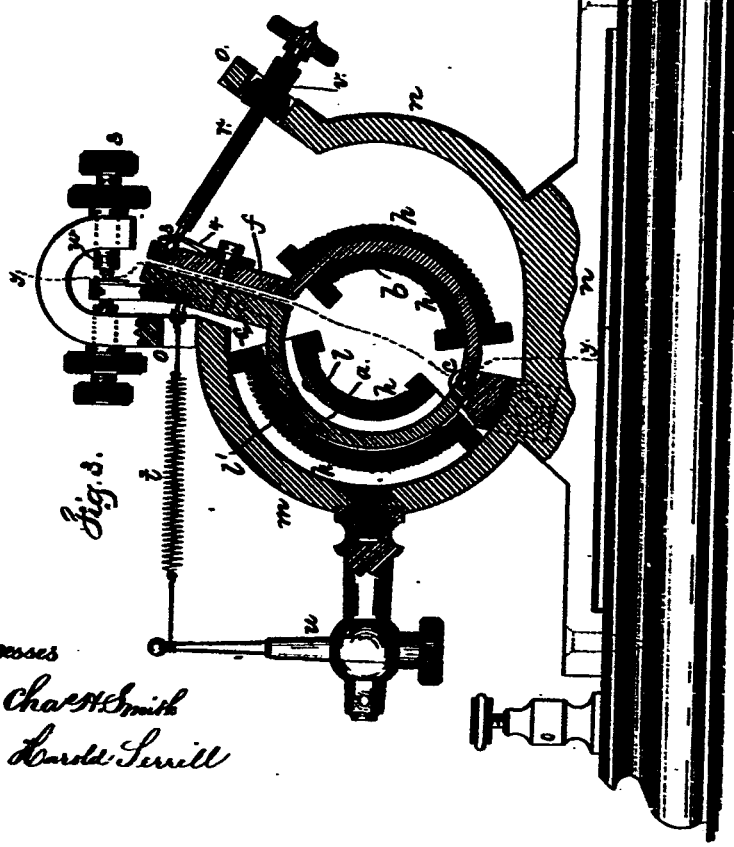

In the drawings, Figure 1 is a partial section of my improved magnet. Fig. 2 is a cross-section at the line *x x*. Fig. 3 is a section of the magnet in the form especially adapted to a relay. Fig. 4 is a cross-section at the line *y y*, and Fig. 5 shows the pivots for the nut of the adjusting-screw.

The magnet is either in the form of a horseshoe, a circle with radial rings, or U-formed. Under all circumstances the poles are brought sufficiently near to each other to be attracted, and the body of the magnet is either formed with a hinge so as to allow the poles to move toward or from each other, or else a portion of the magnet is sufficiently thin and flexible to obtain the necessary spring.

I have shown the magnet as made in two parts, *a b*, hinged together at *c*, and provided with radial poles *e* and *f*, that are sufficiently near each other to be mutually attracted, and around the cores there are helices *h*, through which the electric current flows and polarizes the parts *e f*, so that they attract each other with more or less force according to the strength of the current.

The cores and poles may be of any desired shape sectionally. I prefer, however, to make use of flat metal of about the sectional shape shown in Figs. 2 and 4, so that the contiguous pole-faces will be broad and flat, so as to present large faces and operate when but slightly polarized.

The helices are by preference kept from contact with the cores, so that the latter are free to move the small amount necessary to act in giving sound or in opening and closing a relay-circuit. To accomplish this object I make use of a case, *l*, around the cores that support the helix, and the part *l'* of such case adjacent to the outside of the core should be of thin sheet-iron, so as to become similarly magnetized to the core, and by repulsion aid in moving the core when the electric condition of the helix changes.

The frame that supports the magnet may be of any desired shape. I have shown the same as nearly circular at *m*, with a foot, *n*, and wings *o o* to receive the adjusting-screws *r s*.

When the magnet is used only as a sounder the screws *r* and *s* determine the extent of motion allowed to the moving pole *e* of the magnet, and I prefer to arrange the parts as shown in Fig. 1 and make use of the spring *t* between the pole *e* and the adjusting-screw *s* to draw the pole up or back with the desired force according to the strength of the line or local current, as in adjusting the armature of an ordinary relay or sounder.

The parts of the frame may be made so that the magnet-poles stand vertical or at an inclination instead of being horizontal. This may also be the case in the relay-magnet shown in Fig. 3.

When my device is used as a relay I prefer to pass the screw *r* through an insulated nut, *v*, that is pivoted by the screws 2 2, as shown in Fig. 5, so as to allow of the nut turning as the angle of the screw changes in adjusting the pole *f*, and in this case the end of the screw is formed as a ball, 3, behind the fork of the spring 4.

I also make use of the contact-point *w*, so that the relay-circuit may be closed when the magnet-pole comes into contact with said screw *w*. In this instrument it is preferable to insulate the magnet from the frame and connect one pole of the relay-circuit to the magnet-core and the other to the frame *m*, and thus to the screw-contact point *w*.

It will be evident that in this improved magnet the attractive and repellent forces are operative whenever a change in the electric condition of the helix takes place, and therefore the magnet responds to slighter variations in current than in the ordinary relay or sounder.

The weight of the moving pole or an adjustable weight may take the place of the retractile spring.

I am also aware that a relay or sounder has been made by a single helix and core pivoted at one end to a bar that becomes an armature, and the said bar is provided with devices for limiting the movement of the core and helix; but as the helix moves with the core the inertia prevents the sounder responding rapidly, and also causes the contact-points to become injured.

I claim as my invention—

1. The combination, in a relay magnet or sounder, of two cores of flat soft iron, with the pole-faces adjacent to each other, a joint or spring connecting the cores, helices around both cores, a case between one or each of the cores and the helices of a size sufficiently large to allow of the core moving, and an adjusting screw and spring to determine the movement of the pole, substantially as set forth.

2. The case for one or both of the cores, formed with a strip of soft sheet-iron at the part of the case that is adjacent to the outside of the core, in combination with the helix around the case and the soft-iron core within said case, there being sufficient distance between the core and the case for the former to move laterally in acting as a relay or sounder, substantially as set forth.

Signed by me this 9th day of August, A. D. 1880.

GEORGE LITTLE.

Witnesses:
HAROLD SERRELL,
WILLIAM G. MOTT.